United States Patent [19]
Pater et al.

[11] Patent Number: 5,331,063
[45] Date of Patent: Jul. 19, 1994

[54] TOUGH HIGH PERFORMANCE COMPOSITE MATRIX

[75] Inventors: Ruth H. Pater, Tabb; Norman J. Johnston, Newport News, both of Va.

[73] Assignee: The United States of America as represented by the Administrator of the National Aeronautics and Space Administration, Washington, D.C.

[21] Appl. No.: 968,082

[22] Filed: Oct. 27, 1992

Related U.S. Application Data

[62] Division of Ser. No. 429,514, Oct. 31, 1989, Pat. No. 5,159,029.

[51] Int. Cl.⁵ .............. C08L 79/08; C08J 5/08; C08K 3/04
[52] U.S. Cl. .................. 525/421; 525/426; 525/432; 525/436; 525/903
[58] Field of Search ............ 525/432, 436, 903, 426, 525/421

[56] References Cited

U.S. PATENT DOCUMENTS

| | | | |
|---|---|---|---|
| 4,695,610 | 9/1987 | Egli et al. | 525/426 |
| 4,981,922 | 1/1991 | Sheppard et al. | 525/422 |
| 4,996,101 | 2/1991 | Landis et al. | 428/272 |
| 5,098,961 | 3/1992 | Pater | 525/422 |

Primary Examiner—Ana L. Carrillo
Attorney, Agent, or Firm—George F. Helfrich

[57] ABSTRACT

This invention is a semi-interpenetrating polymer network which includes a high performance thermosetting polyimide having a nadic end group acting as a crosslinking site and a high performance linear thermoplastic polyimide having the following repeating unit.

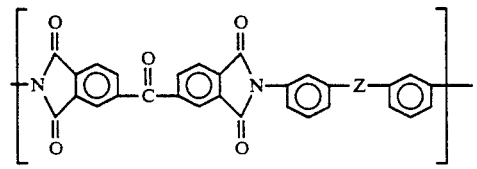

wherein $Z = C$ or $SO_2$.

Provided is an improved high temperature matrix resin which is capable of performing in the 200° to 300° C. range. This resin has significantly improved toughness and microcracking resistance, excellent processability, mechanical performance and moisture and solvent resistances.

3 Claims, 1 Drawing Sheet

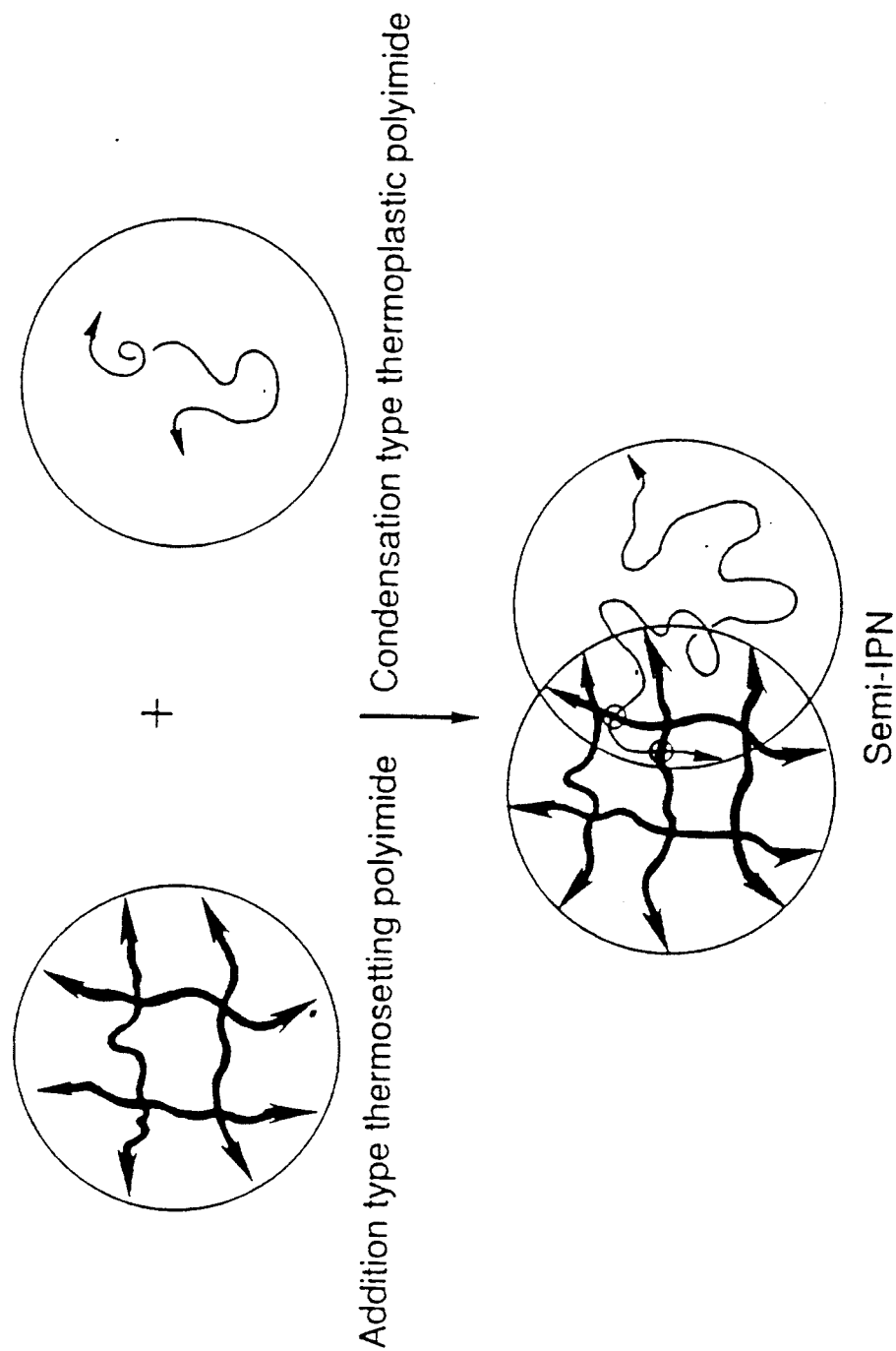

TOUGH HIGH PERFORMANCE COMPOSITE MATRIX

ORIGIN OF THE INVENTION

The invention described herein was made by an employee of the United States Government and may be manufactured and used by or for the Government for governmental purposes without the payment of any royalties thereon or therefor.

This application is a division application of U.S. Ser. No. 07/429,514, filed Oct. 31, 1989, now U.S. Pat. No. 5,159,029.

This application is related to co-pending divisional application Ser. No. 08/018,091, filed Oct. 27, 1992 (NASA Case No. LAR 14338-2) and co-pending patent application Ser. No. 07/829,792, filed Jan. 31, 1992 and Ser. No. 07/831,763, filed Jan. 31, 1992, which are continuation-in-part applications of patent application Ser. No. 07/430,470, filed Nov. 2, 1989, now abandoned.

BACKGROUND OF THE INVENTION

1. Field of the Invention

The present invention relates generally to high temperature polymers. it relates particulady to a semi-interpenetrating polymer network approach to the obtainment of tougher and more microcracking and solvent resistant high temperature polymers particularly adapted for use as moldings, adhesives and composite matrices, and to methods of making the same.

2. Description of the Related Art

The need for lightweight coniponents for use in the 200° to 300° C. range in aircraft, aerospace and electronic technologies has stimulated the development of high performance polymers. Materials used in these environments should exhibit a variety of physical and mechanical properties, which include processing ease, damage tolerance, microcracking resistance, strength, moisture and solvent resistance and thermo-oxidative stability. Although polymers presently exist that exhibit one or more of the above properties, these materials are generally deficient in at least one other desired property.

For instance, the bismaleimide polymer system has been generally the matrix material of choice for fabricating high performance polymer composites. However, it is extremely brittle due to its highly crosslinked network structure. Semilarly, PMR-15, the leading commercial high temperature matrix resin, also suffers the lack of damage tolerance and microcracking resistance. Composite materials based on conventional high temperature thermoplastics, such as LARC-TPI, polyimidesulfone and NR-150 B2 are also deficient in one or more desired properties such as flow properties.

St. Clair et. al. (U.S. Pat. No. 4,695,610) and others have developed semi-interpenetrating polymer network (semi-IPN) polyimides irom easy-to-process but brittle thermosetting polyimides and tough but difficult-to-process thermoplastic polyimides. However, none of these prior art products have the desired combination of properlies set forth hereinabove.

Accordingly, there is a continual search in the art for high temperature polymers exhibiting improved properties, especially for aerospace structural applications.

SUMMARY OF THE INVENTION

It is a primary object of the present invention to provide what the prior art has been unable to provide, viz., an improved matrix resin capable of performing in the 200° to 300° C. temperature range, the resin exhibiting processing ease and significantly improved toughness and microcracking, moisture and solvent resistances. This primary object and other objects and benefits are achieved by the provision of a semi-interpenetrating polymer network comprising a high performance thermosetting polyimide having a nadic end group acting as a crosslink site and a high performance semi-crystalline thermoplastic polyimide having the following repeating units:

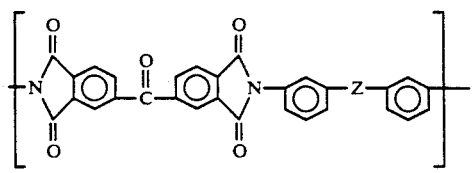

wherein Z is either a carbonyl (O=C) or sulfonyl ($SO_2$) linking group. The polyimide having a carbonyl linking group has been generally known as LaRC-TPI, and the other is called polyimidesulfone (hereinafter referred to as $PISO_2$). A number of additional, especially-preferred embodiments are found in the following Detailed Description of the Invention.

BRIEF DESCRIPTION OF THE DRAWING

The single FIGURE is a schematic depiction of a semi-IPN synthesis.

DESCRIPTION OF THE PREFERRED EMBODIMENTS

The concept of the high performance semi-IPN synthesis is shown in the single FIGURE of the drawing. One or more easy-to-process, but brittle thermosetting polyimides are combined with one or more tough, but difficult-to-process linear thermoplastic polyimides to form a semi-IPN polyimide having a combination of several desirable properties, including easy processability, damage tolerance, good mechanical performance and good thermo-oxidative stability. In the present invention, the combination of desired properties is achieved by controlling factors which include (1) careful selection of constituent polymer components, (2) composition variation of the constituent materials, (3) processing parameters and (4) thermodynamic and chemical kinetics variables to control the phase morphology and phase stability. Each of these factors is discussed in detail in the following paragraphs.

The selection of the constituent thermosetting and thermoplastic polyimides is based primarily on their processing and property compatibility. The processing parameters considered of particular importance are solubility in a common organic solvent and compatible cure cycle. Further, these polymers must have comparable glass transition temperature, mechanical performance and thermo-oxidative stability.

The semi-IPN of this invention comprises (1) a PMR polyimide, which contains a nadic end group acting as a crosslinking site and is prepared by the polymerization of monomer reactant (PMR) process as set forth in U.S. Pat. No. 3,745,149, and (2) a LaRC-TI or $PISO_2$.

Several nadic end-capped PMR-polyimides are considered compatible with both LARC-TPI and $PISO_2$ polyimides and, therefore, can be used in this invention.

These include (1) the polyimide of U.S. Pat. No. 3,745,149, particularly preferred being the polyimide commonly known as PMR-15 which is synthesized according to the following reaction equation:

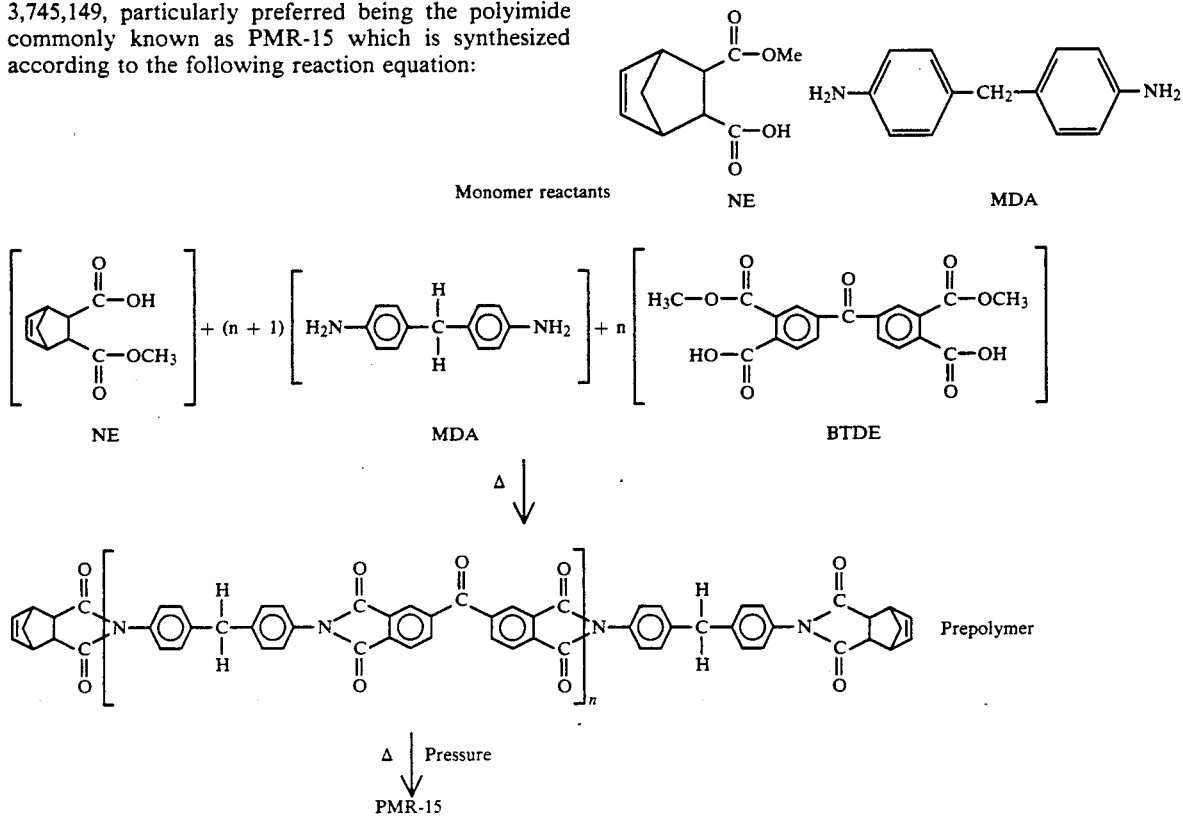

where n=2.87; (2) the polyimide of U.S. Pat. No. 4,569,988, particulady preferred being the polyimide prepared from four monomer compounds having the following formulas:

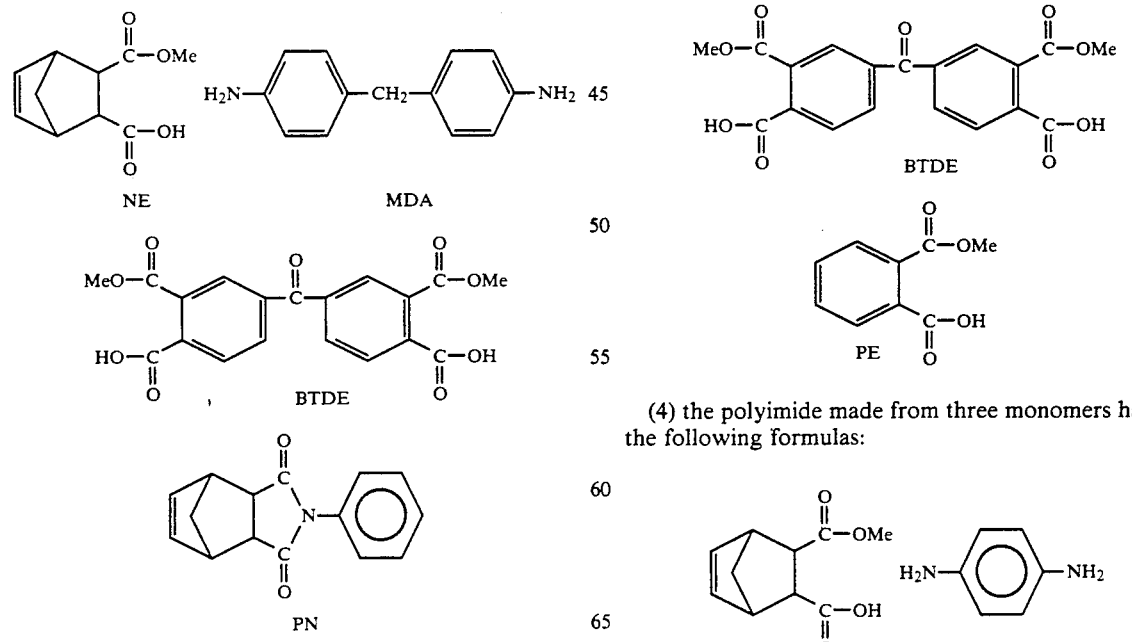

(3) the polyimide made from four monomers having the following formulas:

(4) the polyimide made from three monomers having the following formulas:

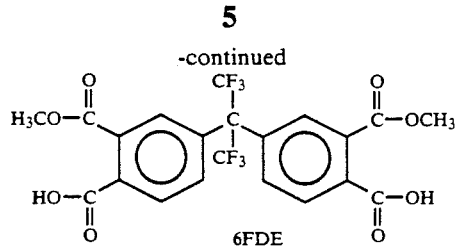

(5) the polyimide made from three monomers having the following formulas:

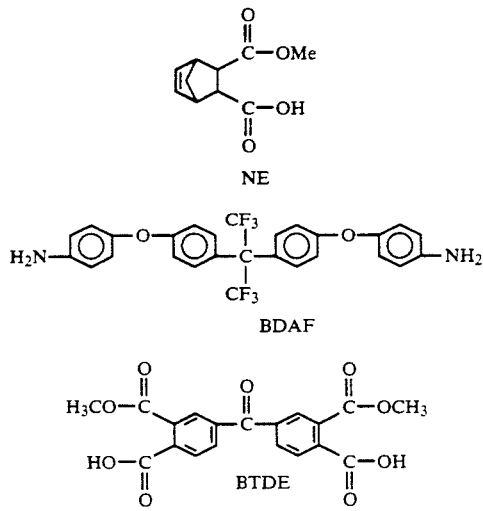

(6) the polyimide made from three monomers having the following formulas:

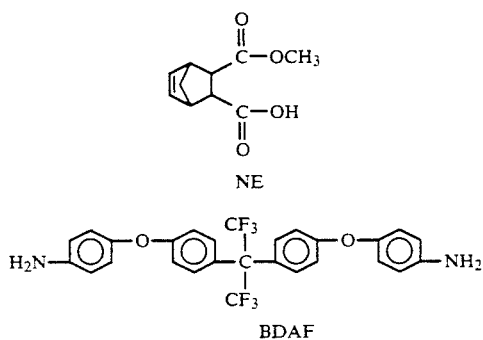

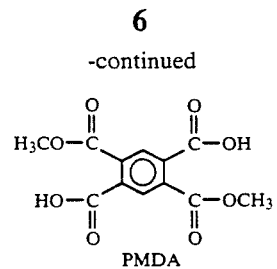

and (7) the polyimide of U.S. Pat. Nos. 4,166,170 and 4,233,258, particularly preferred being the polyimide made from three monomers having the following formulas:

The LaRC-TPI materials are commercially available from Mitsui Toatsu Chemicals, Chiyoda-ku, Tokyo, Japan in at least three forms: (1) polyamic acid as a 30 weight percent solution in N,N-dimethylacetamide (DMAc), (2) fully imidized polyimide powder, and (3) a new version with controlled molecular weight 1500 series powders.

The polyamic acid and polyimide can also be prepared as set forth in U.S. Pat. Nos. 4,094,862 and 4,065,345 according to the following reaction:

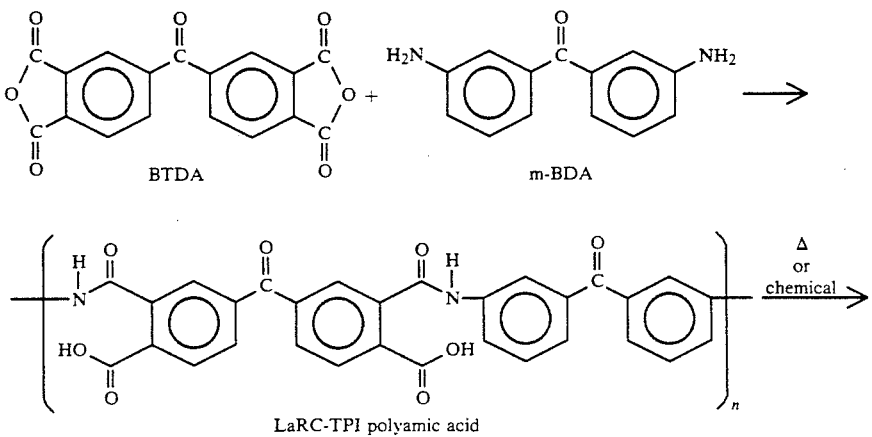

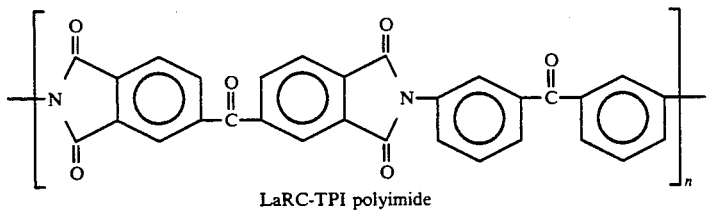

LaRC-TPI polyimide

Similarly, the PISO$_2$ materials can be purchased from High Technology Services Inc. Troy, N.Y. in two forms: polyamic acid as a 30 weight percent solution in diglyme, and fully imidized polyimide powder. These materials can also be prepared as set forth in U.S. Pat. Nos. 4,398,021 and 4,489,027 according to the following reaction:

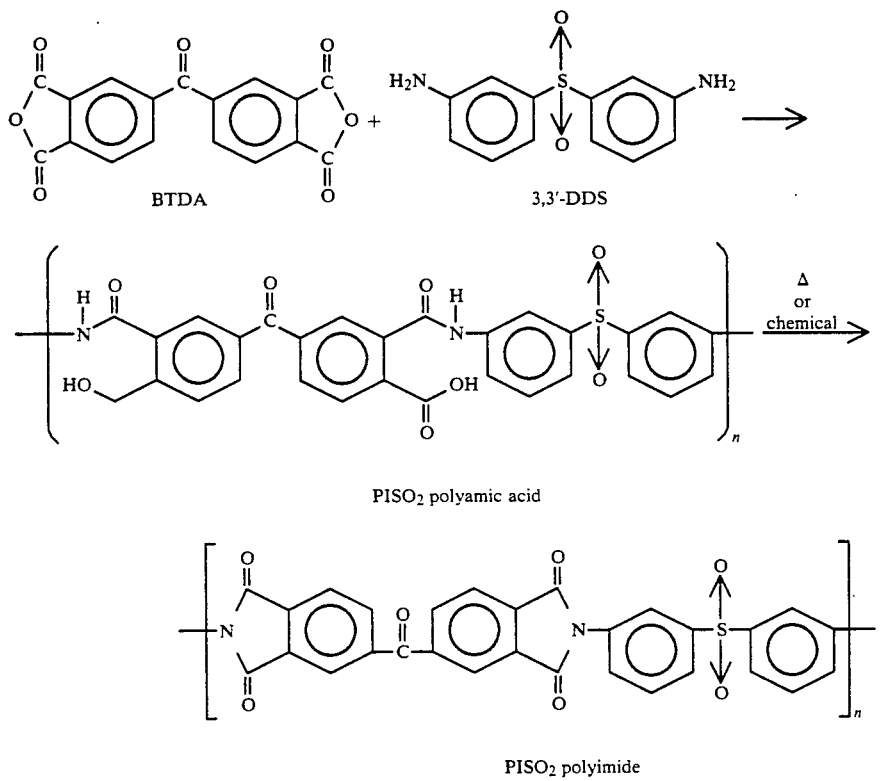

The composition of the constituent thermosetting and thermoplastic polyimides significantly affects many aspects of the processing, properties and morphology of the semi-IPN. It has been found that increasing the concentration of the thermoset component increases the processability and performance of the semi-IPN, but at a cost of decreasing toughness characteristics. While the weight ratio of the PMR polyimide to LaRC-TPI or PISO$_2$ can be varied from 95:5 to 5:95, the ratio between 80:20 to 20:80 is preferred. However, the ratio of 80:20 is particularly preferred because this composition offers the best overall balance of processing, performance and cost effectiveness.

The synthesis of the present semi-IPN can proceed in two major ways: simultaneous and sequential. In the former, the uncrosslinked PMR prepolymers are combined with the monomer precursors of the LaRC-TPI or PISO$_2$. With application of heat, the PMR prepolymers are allowed to crosslink in the immediate presence of the thermoplastic polyimide undergoing simultaneous linear chain extension. This synthesis can lead to a network in which one polymer interlocks with the other prepolymer, forming permanent entanglements at the interfacial regions of the two polymer systems. The resulting physical crosslinking provides synergistic properties. This synthesis is designed so that the constituent polymers are formed independently without any chemical interference between the precursors of the thermosetting and thermoplastic polyimides. The sequential method involves a process in which one polymer is synthesized and/or crosslinked in the immediate presence of the other which has been prepolymerized. There are two sequential semi-IPNs: semi-1-IPN and semi-2-IPN. The former is prepared by polymerizing a linear polymer in a crosslinked network. The reverse sequence results in a semi-2-IPN. In this invention, the semi-2-IPN method is preferred, because it offers easier processing, better performance and less phase separation, as compared with the simultaneous approach. There is yet another synthetic method which is non-conventional. This method involves mixing the monomers of the thermosetting component with the monomers of the thermoplastic component and allowing the monomers to react randomly to form a simultaneous semi-IPN. The inter-reaction between monomers of the thermoset and thermoplastic occurs, which results in a semi-IPN significantly different in chemical structure and properties from those prepared by the previous methods.

A method to control the phase morphology and phase stability has been investigated. It involves the addition of 0.1 to 5 weight percent of NE into the LaRC-TPI monomer precursors. To this mixture, the uncrosslinked PMR prepolymers are added. The concept involves lightly end-capping the LaRC-TPI with a nadic group to form a nadic end-capped LaRC-TPI polyimide. Through the common nadic end group, the nadic end-capped LaRC-TPI is then crosslinked with the PMR polyimide to give a graft copolymer upon heating. This reaction is shown below, wherein $n_1 = 20$ to 55 and $n_2 = 2.987$, and wherein $X:Y = 80:20$ to $20:80$.

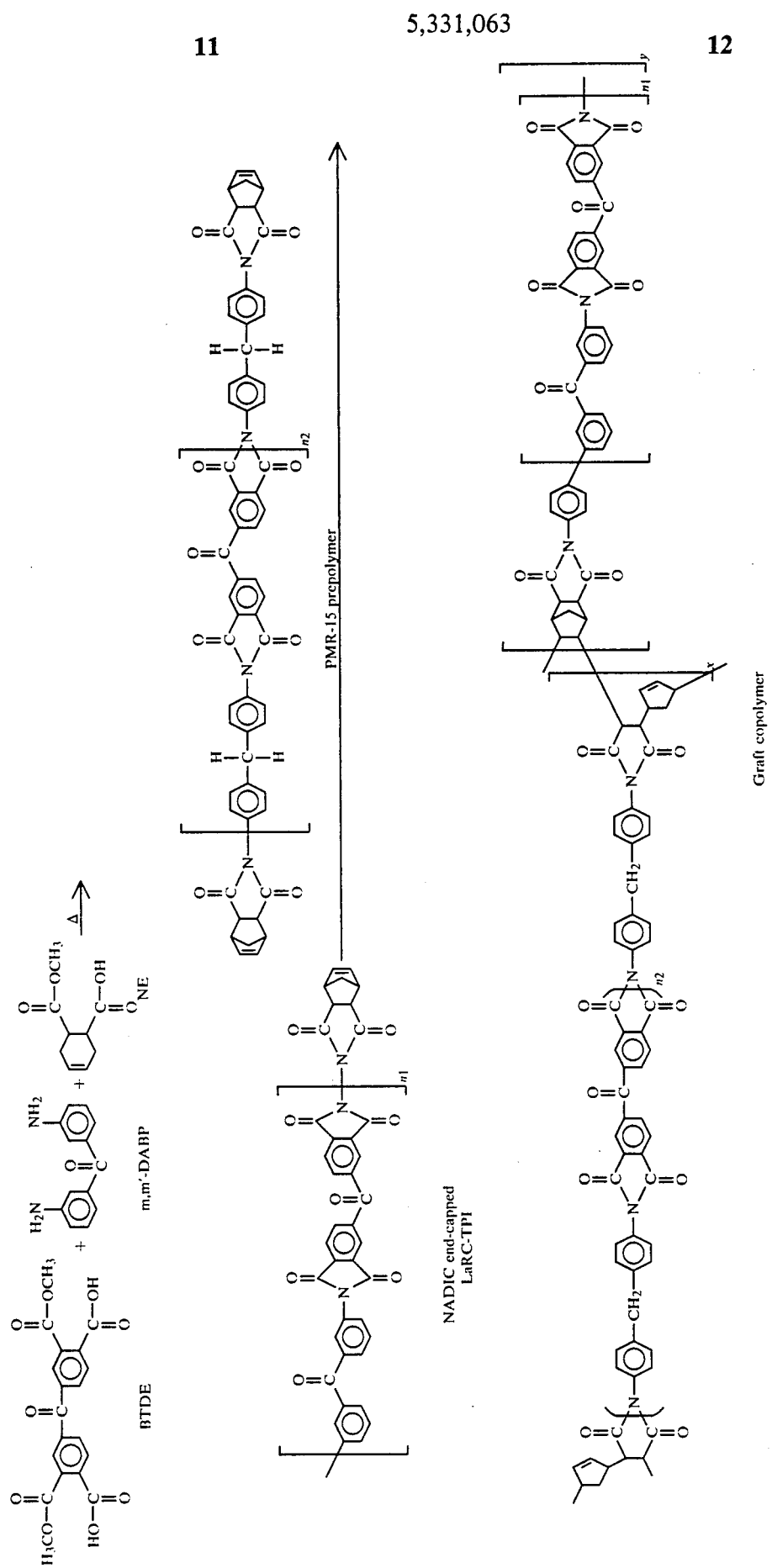

Because of chemical bonding between the constituent polymers, the resultant graft copolymer exhibits less phase separation and better long term phase stability, as compared with the physically crosslinked semi-IPNs prepared by the previous methods.

The semi-IPN polyimide of this invention is adapted for use as a composite matrix, and as an adhesive and molding compound suitable for aerospace structural applications in the 200° to 300° C. temperature range.

The following are examples that illustrate preparation and use of the semi-IPNs for applications in advanced composites, structural adhesives and molding articles. However, it is to be understood that the examples are merely illustrative and intended to enable those skilled in the art to practice the invention in all of the embodiments flowing therefrom and do not in any way limit the scope of the invention as defined in the claims.

EXAMPLES

Example 1

Preparation of PMR-15 Prepolymer

To 51.949 g of a 50 weight percent methanol solution of dimethyl ester of 3,3',4,4'-benzophenonetetracarboxylic acid (BTDE) (25.9 g, 0.0673 mole) was added 19.72 g (0.0996 mole) of 4,4'-methylenedianiline (MDA), 12.6 g (0.0645 mole) of monomethyl ester of 5-norbornene-2,3-dicarboxylic acid (NE) and 32.5 g of anhydrous methanol. The mixture was stirred at room temperature for one-half hour to give a 50 weight percent PMR-15 monomer solution. The solution was concentrated at 80° C. in a nitrogen atmosphere for two hours, followed by drying at 100° C. in air for two hours, and then staging at 150° C. in air for one and one-half hours to yield a brown PMR-15 molding powder. The PMR-15 molding powder was soluble in NMP, dimethylformamide (DMF), and N,N-dimethylacetamide (DMAc). Its DSC scan showed one endotherm at about 221° C., which is due to the melt-flow of PMR-15 molding powder. This molding powder was subsequently used to prepare the semi-IPN molding compounds and composites to be described in the following examples.

Example 2

Preparation of Semi-2-IPN of PMR-15 and LaRC-TPI (LaRC-RP41)

To 18.5600 g of the above PMR-15 preimidized molding powder was added 15.4667 g of the 30 weight percent LaRC-TPI polyamic acid solution in DMAc obtained commercially from Mitsui Toatsu Chemicals and 43.28 g of freshly distilled DMAc. The mixture was stirred at room temperature for two hours to give a clear brown solution which contained 30 percent by weight of solids. The weight ratio of the PMR-15 molding powder and LaRC-TPI polyamic acid was 80 to 20. This composition was designated LaRC-RP41. This solution was concentrated in an oven at 150° C. under vacuum (30 inch Hg) for one hour and then staged at 220° C. in air for one hour to afford the LaRC-RP41 molding powder. The molding powder (14.59 grams) was then placed in a cold matched metal die. This was then inserted into a press preheated to 316° C. A thermocouple was attached to the die to determine the thermal history. When the die temperature reached 232° C., 2000 psi pressure was applied. The temperature was raised to 316° C. at a rate of 4° C./minute. The neat resin was cured at 316° C. in air under 2000 psi pressure for one hour. The temperature was further increased to 350° C. at a rate of 4° C./minute. The neat resin was cured at 350° C. for 5 minutes under 2000 psi pressure. This step was done to melt the LaRC-TPI crystals in order to enhance the melt-flow properties of LaRC-TPI. The 350° C. heat treatment irreversibly eliminates crystallinity in the material. When the die cooled to room temperature, the neat resin was removed from the press. This afforded a neat resin having dimensions of 3.2 cm by 3.2 cm by 1.0 cm. The optical microscopic examination of the cross-section of the neat resin showed no detectable voids or defects. The resin was then accepted for impact tension specimen preparation without further post-curing. However, for other test specimen preparations, the cured resin was subjected to a post-curing at 316° C. for 16 hours in air. In order to compare properties, the neat resins of the constituent polymers, namely PMR-15 and LARC-TPI, were also prepared following the procedure given above with the following exceptions: PMR-15 was cured one hour at 316° C. under 2000 psi pressure without the additional curing at 350° C.; LaRC-TPI was cured one hour at 316° C. and one hour at 350° C. under 4000 psi pressure. Table 1 shows the neat resin properties of LaRC-RP41 and constituent materials. Table 2 gives the results of the morphological studies of the LaRC-RP41 neat resin and composite.

TABLE 1

Neat Resin Properties of Semi-IPN Polyimide Compared with Constituent Materials

| Property | LaRC-RP41 | PMR-15$_{TM}{}^f$ (NASA) | LaRC-TPI$_{TM}{}^f$ (NASA) |
|---|---|---|---|
| Glass Transition Temperature, °C.$^a$ | 261, 325 | 327 | 257 |
| Toughness, $G_{Ic}$, J/m$^{2b}$ | 476 | 87 | 662$^g$ |
| Isothermal Weight Loss, %$^c$ | | | |
| After 1000 hrs at 316° C. in air | 10.6 | 8.0 | — |
| After 50 hrs at 316° C.$^c$ | 1.5 | 3.0 | — |
| After 50 hrs at 371° C.$^c$ | 8.0 | 17.0 | — |
| After 18 hrs at 426° C.$^c$ | 74.0 | 99.0 | — |
| Moisture Resistance, %$^d$ | 0.4 | 1.6 | 1.1 |
| Solvent Resistance$^e$ Wt. loss % | 4.9 | 7.6 | 2.1 |

$^a$By TMA; $^b$Per ASTM E399; $^c$By TGA at a heating rate of 2.5° C./min in air; $^d$2 weeks in water at 25° C.; $^e$100 hrs in boiling N,N-dimethylformamide; $^f$Tested by present inventor; $^g$Reported by A. K. St. Clair and T. L. St. Clair, NASA 84516 (1982).

TABLE 2

Phase Morphology and Stability of Semi-IPN of
PMR-15 and LaRC-TPI (LaCR-RP41)[a]

| Method | Neat Resin | | Composite |
|---|---|---|---|
| Used | As Fabricated | Aged[b] | As Fabricated |
| OM[c] | ND[e] | ND[e] | — |
| SEM[c] | ND[e] | ND[e] | ND[e] |
| DMA[c] | Two phases | — | — |
| TBA[c] | — | — | One phase |
| TMA[c] | Two phases | One phase | One phase |
| DSC[c] | Two phases | — | — |

[a]Surfaces extracted by N,N-dimethylformamide at 153° C. for 100 hrs; [b]1000 hrs at 316° C. in air; [c]OM = optical microscopy, SEM = Scanning Electron Microscopy, DMA = Dynamic Mechanical Analysis, TBA = Torsional Braid Analysis, TMA = Thermal Mechanical Analysis and DSC = Differential Scanning Calorimetry; [e]No phase separation detected.

Example 3

Preparation of Sem-2-IPN of PMR-15 and PISO$_2$
(LaRC-RP92)

As in Example 2, a 40 weight percent resin solution was prepared by stirring 43.75 g of the PISO$_2$ polyamic acid solution obtained from High Tech Services as a 30 weight percent solution in diglyme, 52.50 of the PMR-15 molding powder from Example 1 and 68.30 g of diglyme in an ice-water bath for 3 hours. Initially, the PMR-15 powder appeared to be insoluble in the diglyme solution, but it went into the solution after stirring in an ice-water bath for 3 hours to give a viscous red-brown solution. This composition contained 80:20 weight ratio of the PMR-15 molding powder and PISO$_2$ polyamic acid, and was designated LaRC-RP92. As in Example 2, the viscous red-brown solution was concentrated to give a yellow solid. About 14.9 g of the LaRC-RP92 yellow molding powder was compression molded using the cure cycle of Example 2, resulting in a void-free neat resin having dimensions of 3.2 cm by 3.2 cm by 0.9 cm (density 1.31 g/cc). The molding was machined into compact tension testing specimens without further post curing. The remaining material was post cured at 316° C. for 16 hours in air and then submitted for other testing. Table 3 shows the neat resin properties of LaRC-RP92 and its constituent material properties.

TABLE 3

Neat Resin Properties of Semi-IPN Polymide
Comparaed with Constituent Materials

| Property | LaRC-RP92 | PMR-15$_{TM}$[f] (NASA) | PISO$_2$$_{TM}$[g] (NASA) |
|---|---|---|---|
| Glass Transition Temperature, °C.[a] | 335 and 402 | 327 | 239 |
| Toughness, G$_{lc}$, J/m$^2$[b] | 332 | 87 | 1400 |
| TGA in Air[c] | 465 | 462 | — |
| Temperature at 5% Wt. Loss. °C. | | | |
| Moisture Resistance, %[d] | — | 1.6 | — |
| Solvent Resistance[e] Wt. Loss, % | 1.2 | 7.6 | — |

See Table 1 for footnotes a[1]through f: [g]Reported by the inventors in U.S. Pat Nos. 4,398,021 and 4,489,027.

Example 4

Preparation of Celion 6000/LaRC-RP41

As in Example 2, a 30 weight percent resin solution was prepared by mixing 52.50 g of the PMR-15 molding powder, 43.75 g of the LARC-TPI polyamic acid solution and 68.31 g of freshly distilled DMAc. The prepreg was prepared by passing a single tow of unsized Celion 6000 graphite fiber through the resin solution contained in a dip tank and onto a 12-inch diameter multiple speed drum winder wrapped with release paper. This afforded a 23.5 cm by 190 cm wet prepreg. By visual inspection, the prepreg showed good drape and lack characteristics. The tapes were dried on the rotating drum at room temperature for 16 hours, removed from the drum and cut into 7.6 cm by 17.8 cm plies. Twelve plies were stacked unidirectionally and then staged at 204° C. for one hour in an air-circulating oven. The staged lay-up was placed in a cold matched metal die. This was then inserted into a preheated 316° C. press. A thermocouple was attached to the matched die to determine the temperature. When the die temperature reached 232° C., 1000 psi pressure was applied. The temperature was raised to 316° C. at a rate of 6° C./minute. The composite was cured at 316° C. for one hour and 350° C. for one-half hour under 1000 psi pressure, and removed from the press when the die temperature reached 177° C. The composite was then postcured at 316° C. in air for 16 hours. The ultrasonic C-scan of the composite showed no detectable voids or defects and, thus, the composite was accepted for test specimen preparation. For comparison purposes, a Celion 6000/PMR-15 composite was also fabricated using the same cure cycle except that 500 psi pressure, instead of 1000 psi pressure, was used, and no further curing at 350° C. was made.

Table 4 compares the composite properties between LaRC-RP41 and its constituent materials.

TABLE 4

Unidirectional Composite Properties of Semi-IPN
Compared with Constituent Materials

| Property | LaRC-RP41[d] | PMR-15$_{TM}$[d,e] (NASA) | LARC-TPI$_{TM}$[d,f] (NASA) |
|---|---|---|---|
| Glass Transition Temperature. °C.[a] | 332 | 338 | 244[g] |
| Density, g/cc | 1.58 | 1.58 | 1.55 |
| Flexural Strength. Ksi[b] | | | |
| 25° C. | 290 | 268 | 232 |
| 232° C. | 186 | 159[h] | — |
| Flexural Modulus. Msi[b] | | | |
| 25° C. | 18 | 17 | 15 |
| 232° C. | 17 | 13[h] | — |
| Interlaminar Shear Strength. Ksi[c] | | | |
| 25° C. | 15.9 | 16 | — |
| 232° C. | 9.4 | 8[h] | 6[i] |

[a]By TMA; [b]Per ASTM D790; [c]Per ASTM D2344; [d]Reinforced with unsized Celion 6000 graphite fibers; [e]Tested by present inventor. [f]Reported by A. K. St. Clair and T. L. St. Clair. NASA TM 84516 (1982); [g]No postcure. the others postcured at 316° C. for 16 hrs in air; [h]Tested at 316° C.; [i]Tested at 177° C.

Example 5

Preparation of Celion 6000/LaRC-RP92

A 40 weight percent resin solution of LaRC-RP92 from Example 3 was used to prepare a prepreg tape which was subsequently compression molded using the processing conditions of Example 4. The wet prepreg had good tack and drape. However, the cured composite showed some voids as detected by ultrasonic C-scan. Table 5 shows the composite properties for LaRC-RP92 and its constituent materials.

TABLE 5

Unidirectional Composite Properties of Semi-IPN Compared with Consstituent Materials

| Property | LaRC-RP92d[d] | PMR-15$_{TM}$[d,e] (NASA) | PISO$_2{}_{TM}$[d,f] (NASA) |
|---|---|---|---|
| Glass Transition Temperature, °C.[a] | 325 | 338 | 205 |
| Density, g/cc | 1.50 | 1.58 | 1.50 |
| Flexural Strength, Ksi[b] | | | |
| 25° C. | 115.0 | 268 | — |
| 232° C. | 113.0 | 159[h] | — |
| Flexural Modulus, Msi[b] | | | |
| 25° C. | 12.0 | 17 | — |
| 232° C. | 12.0 | 13[h] | — |
| Interlaminar Shear Strength, Ksi[c] | | | |
| 25° C. | 12.6 | 16 | 12 |
| 232° C. | 8.7 | 8[h] | 7[i] |

See Table 4 for all footonets except [f]Reported by the inventors in U.S. Pat. Nos. 4,398,021 and 4,489,027.

Example 6

To make a realistic assessment of composite microcracking behavior, a cross-ply composite having a [0,90,0]s layup was fabricated for LaRC-RP41, LaRC-RP92, and PMR-15 as a control. The fabrication of the cross-ply composites follows the same procedure as their unidirectional counterparts described in the previous examples. Specimens (1.5 cm by 0.6 cm by 0.13 cm) were machined from the cured cross-ply composites and were subjected to thermal cycling. The temperature was varied from −156° to 288° C. with a total time of 15 minutes for each cycle. Liquid nitrogen was used as a cooling agent. After 1000 and 1500 thermal cycles the unpolished surfaces were examined by scanning electron microscopy (SEM). Micrographs were taken at both 100 and 2000× magnification. Table 6 shows the composite microcracking properties.

TABLE 6

Microcracking Properties of Semi-IPN Composite Compared with Constituent Material After 1500 Thermal Cycles[a]

| Property | LaRC-RP41[b] | PMR-15$_{TM}$[b,c] (NASA) |
|---|---|---|
| Microcracks/in | 12 | Extensive |
| 316° C. Interlaminar Shear Strengths, Ksi | 4.5 | 3.6 |
| Moisture Absorption, %[d] | | |
| As Fabricated | 0.7 | 1.3 |
| After 1500 Thermal Cycles | 1.8 | 2.4 |

[a]Thermal cycling temperature from −156° to 288° C.; [b]Reinforced with unsized Celion 6000 graphite fibers; [c]Tested by present inventor; [d]1 year in water at 25° C.

Example 7

To investigate the relations between resin composition, composite processing and composite performance, two unidirectional composites were fabricated from the compositions containing 50:50 and 20:80 weight ratios of the PMR-15 molding powder and LaRC-TPI polyamic acid. The composite fabrications follow the procedure of Example 4. Based on the results of the ultrasonic C-scans and composite properties, a correlation exists between the concentration of LaRC-TPI and the ease of semi-IPN composite processing. Increasing the thermoplastic concentration decreases the semi-IPN composite processability and performance.

What is claimed as new and desired to be secured by Letters Patent of the United States is:

1. A process for preparing a semi-interpenetrating polymer network which process comprises reacting an uncrosslinked, nadic end-capped thermosetting polyimide prepolymer with a polyamic acid precursor of a linear thermoplastic polyimide having the following repeating unit:

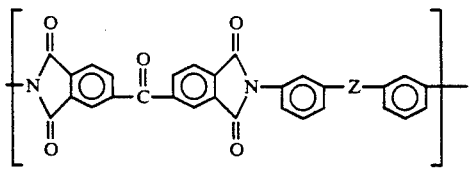

wherein Z=O=C or SO$_2$, to form a semi-2-interpenetrating polymer network, wherein the thermosetting polyimide has a repeating unit which is not identical to the repeating unit of the thermoplastic polyimide.

2. A process for preparaing a semi-interpenetrating polymer network, which process comprises crosslinking an uncrosslined, nadic end-capped thermosetting polyimide prepolymer in the presence of a linear thermoplastic polyimide having the following repeating unit:

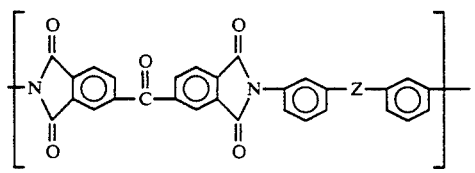

wherein Z=O=C or SO$_2$, to form a sequential semi-2-interpenetrating polymer network, wherein the thermosetting polymide has a repeating unit which is not identical to the repeating unit of the thermoplastic polyimide.

3. A process for preparing a semi-interpenetrating-polymer network, which process comprises mixign monomer precursors of a thermosetting polyimide having a nadic end group acting as a crosslinking site, and monomer precursors of a linear thermoplastic polyimide having the following repeating unit:

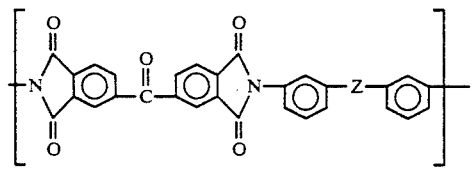

wherein Z=O=C or SO$_2$, and allowing all said precursors to react randomly to form a simultaneous semi-interpenetrating polymer network, wherein the thermosetting polyimide has a repeating unit which is not identical to the repeating unit for the thermoplastic polyimide.

* * * * *